(12) United States Patent
Mazzarese et al.

(10) Patent No.: US 10,608,798 B2
(45) Date of Patent: *Mar. 31, 2020

(54) METHOD AND DEVICE FOR NOTIFYING REFERENCE SIGNAL CONFIGURATION INFORMATION

(71) Applicant: HUAWEI TECHNOLOGIES CO., LTD., Shenzhen, Guangdong (CN)

(72) Inventors: David Mazzarese, Beijing (CN); Yuan Xia, Beijing (CN); Liang Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,801

(22) Filed: Jan. 16, 2019

(65) Prior Publication Data

US 2019/0149296 A1    May 16, 2019

Related U.S. Application Data

(63) Continuation of application No. 15/447,071, filed on Mar. 1, 2017, now Pat. No. 10,193,675, which is a
(Continued)

(30) Foreign Application Priority Data

Aug. 2, 2010    (CN) .......................... 2010 1 0244548

(51) Int. Cl.
*H04L 5/00* (2006.01)
*H04W 72/04* (2009.01)
(Continued)

(52) U.S. Cl.
CPC .......... *H04L 5/0048* (2013.01); *H04L 5/0051* (2013.01); *H04L 5/0094* (2013.01);
(Continued)

(58) Field of Classification Search
None
See application file for complete search history.

(56) References Cited

U.S. PATENT DOCUMENTS

| 6,542,478 B1 | 4/2003 | Park |
| 2005/0128999 A1 | 6/2005 | Kwon et al. |

(Continued)

FOREIGN PATENT DOCUMENTS

| CN | 101252775 A | 8/2008 |
| CN | 201307860 Y | 9/2009 |

(Continued)

OTHER PUBLICATIONS

3GPP TSG RAN WG1 meeting #61bis, R1-103444, Huawei:"Email discussion summary on CSI-RS pattern proposals" Dresden, Germany, Jun. 28-Jul. 2, 2010. 6 pages.
(Continued)

*Primary Examiner* — Hassan A Phillips
*Assistant Examiner* — Gautam Sharma
(74) *Attorney, Agent, or Firm* — Huawei Technologies Co., Ltd.

(57) ABSTRACT

Method and device for notifying reference signal configuration information are disclosed. Channel state information-reference signal (CSI-RS) configuration information is coded, to obtain one or more CSI-RS configuration codes. The CSI-RS configuration codes are sent to a terminal device. The terminal device determines, based on CSI-RS configuration codes, CSI-RS configuration information such as a quantity of antenna ports for transmitting a CSI-RS, a CSI-RS pattern, a CSI-RS period and an offset corresponding to the CSI-RS period.

14 Claims, 8 Drawing Sheets

Related U.S. Application Data continuation of application No. 15/243,985, filed on Aug. 23, 2016, now Pat. No. 9,608,787, which is a continuation of application No. 13/757,425, filed on Feb. 1, 2013, now Pat. No. 9,439,172, which is a continuation of application No. PCT/CN2011/074890, filed on May 30, 2011.

(51) Int. Cl.
    *H04L 27/26*     (2006.01)
    *H04W 88/08*     (2009.01)

(52) U.S. Cl.
    CPC ......... *H04L 27/2601* (2013.01); *H04W 72/04* (2013.01); *H04W 72/042* (2013.01); *H04W 88/08* (2013.01)

(56) References Cited

U.S. PATENT DOCUMENTS

| | | | |
|---|---|---|---|
| 2007/0066225 | A1 | 3/2007 | Zheng et al. |
| 2008/0212702 | A1 | 9/2008 | Pan et al. |
| 2010/0067472 | A1 | 3/2010 | Ball et al. |
| 2011/0026445 | A1 | 2/2011 | Hao et al. |
| 2011/0199986 | A1 | 8/2011 | Fong et al. |
| 2011/0235743 | A1 | 9/2011 | Lee et al. |
| 2011/0317657 | A1 | 12/2011 | Chmiel et al. |
| 2012/0176982 | A1 | 7/2012 | Zirwas et al. |
| 2012/0220327 | A1 | 8/2012 | Lee et al. |
| 2012/0243500 | A1 | 9/2012 | Chandrasekhar et al. |
| 2012/0264441 | A1 | 10/2012 | Chandrasekhar et al. |
| 2013/0294536 | A1 | 11/2013 | Pan et al. |

FOREIGN PATENT DOCUMENTS

| | | |
|---|---|---|
| CN | 101729091 A | 6/2010 |
| CN | 101765134 A | 6/2010 |
| EP | 2555439 A1 | 2/2013 |
| EP | 2573953 A2 | 3/2013 |
| WO | 2010018226 A2 | 2/2010 |
| WO | 2010145080 A1 | 12/2010 |
| WO | 2010148959 A1 | 12/2010 |
| WO | 2011055986 A2 | 5/2011 |
| WO | 2011087252 A2 | 7/2011 |
| WO | 2011100520 A1 | 8/2011 |
| WO | 2011119005 A2 | 9/2011 |

OTHER PUBLICATIONS

ZTE Corporation:"DL Reference Signal Design for CSI generation in LTE-Advanced", 3GPP TSG-RAN WG1 Meeting #58, R1-093196, ShenZhen, China, Aug. 24-Aug. 28, 2009. Total 5 pages. XP050351549A.

Qualcomm Incorporated:"Further details on CSI-RS", 3GPP TSG-RAN WG1 #60bis, R1-103288, Montreal, Canada, May 10-14, 2010. Total 11 pages. XP050598363A.

3GPP TSG RAN WG1 meeting #62 R1-104290,"CSI-RS Pattern Signalling",Huawei, Aug. 23-27, 2010,total 6 pages.

3GPP TSG RAN WG1 meeting #62bis R1-105131,"Remaining issues on CSI RS signalling",Huawei, HiSilicon, Oct. 11-15, 2010,total 11 pages.

3GPP TS 36.211 V9.1.0.3rd Generation Partnership Project;Technical Specification Group Radio Access Network; Evolved Universal Terrestrial Radio Access (E-UTRA);Physical Channels and Modulation(Release 9),Mar. 2010,total 85 pages.

3GPP TS 36.213 V9.2.0,3rd Generation Partnership Project;Technical Specification Group Radio Access Network; Evolved Universal Terrestrial Radio Access (E-UTRA);Physical layer procedures(Release 9),Jun. 2010,total 80 pages.

3GPP TS 36.331 V9.3.0,3rd Generation Partnership Project;Technical Specification Group Radio Access Network; Evolved Universal Terrestrial Radio Access (E-UTRA);Radio Resource Control (RRC); Protocol specification(Release 9),Jun. 2010,total 250 pages.

METHOD AND DEVICE FOR NOTIFYING REFERENCE SIGNAL CONFIGURATION INFORMATION

CROSS-REFERENCE TO RELATED APPLICATIONS

This application is a continuation of U.S. patent application Ser. No. 15/447,071, filed on Mar. 1, 2017, now U.S. Pat. No. 10,193,765, which is a continuation of U.S. patent application Ser. No. 15/243,985, filed on Aug. 23, 2016, now U.S. Pat. No. 9,608,787. The U.S. patent application Ser. No. 15/243,985 is a continuation of U.S. patent application Ser. No. 13/757,425, filed on Feb. 1, 2013, now U.S. Pat. No. 9,439,172. The U.S. patent application Ser. No. 13/757,425 is a continuation of Internation Application No. PCT/CN2011/074890, filed on May 30, 2011. The Internation Application No. PCT/CN2011/074890 claims priority to Chinese Patent Application No. 201010244548.2, filed on Aug. 2, 2010. All of the afore-mentioned patent applications are hereby incorporated by reference in their entireties.

FIELD OF THE INVENTION

The present disclosure relates to the field of communications technology, and in particular, to a method and a device for notifying reference signal configuration information.

BACKGROUND

In a wireless communication system, a network device needs to notify a terminal (also called user equipment or UE) in a coverage area of reference signal configuration information, so that the UE can perform downlink channel estimation according to the reference signal configuration information, thus improving bit error performance of the system.

The prior art discloses a manner of notifying the UE of common reference signal (CRS) configuration information. In practical application, the network device notifies the UE of a pilot pattern through a manner of performing a shift operation on an implicit mapping that binds the pilot pattern of a downlink CRS with a cell identifier, and further, implicitly notifies the UE of the number of ports of the CRS through system information block (SIB) signaling.

In the process of implementing embodiments of the present disclosure, the inventor finds that the prior art has at least the following disadvantages:

In the prior art, because the UE is merely notified of the CRS configuration information, through the implicit mapping that binds the pilot pattern with the cell identifier, the number of downlink channels of different cells that can be distinguished by the UE is limited by the number of the cell identifiers, and in a coordinated multipoint processing (CoMP) system, CRSs in one CoMP measurement set, which includes multiple possible CoMP collaborative cells, may collide with each other.

SUMMARY

In order to prevent reference signals of multiple cells from colliding with each other when a signaling overhead is small, embodiments of the present disclosure provide a method and a device for notifying reference signal configuration information. The technical solutions are as follows.

According to one aspect, a method for notifying reference signal configuration information is provided, where the method includes:

coding, according to channel state information-reference signal (CSI-RS) configuration information, the CSI-RS configuration information, to obtain a CSI-RS configuration information code, where the CSI-RS configuration information includes at least the number of ports, a pilot pattern, a pilot period and a sub-frame offset;

storing a mapping relation between the CSI-RS configuration information code and the CSI-RS configuration information, and sending the mapping relation between the CSI-RS configuration information code and the CSI-RS configuration information to a user equipment (UE) for storage;

determining CSI-RS configuration information to be notified, and searching, in the stored mapping relation between the CSI-RS configuration information code and the CSI-RS configuration information, for a CSI-RS configuration information code corresponding to the CSI-RS configuration information to be notified; and sending the found CSI-RS configuration information code to the UE, so that the UE determines CSI-RS configuration information according to the received CSI-RS configuration information code and the mapping relation between the CSI-RS configuration information code and the CSI-RS configuration information, where the mapping relation between the CSI-RS configuration information code and the CSI-RS configuration information is stored by the UE.

According to another aspect, a device for notifying reference signal configuration information is provided, where the device includes:

a coding module, configured to code, according to channel state information-reference signal (CSI-RS) configuration information, the CSI-RS configuration information, to obtain a CSI-RS configuration information code, where the CSI-RS configuration information includes at least the number of ports, a pilot pattern, a pilot period and a sub-frame offset;

a storing module, configured to store a mapping relation between the CSI-RS configuration information code obtained by the coding module and the CSI-RS configuration information;

a first sending module, configured to send the mapping relation between the CSI-RS configuration information code and the CSI-RS configuration information, where the mapping relation between the CSI-RS configuration information code and the CSI-RS configuration information is stored by the storing module, to a user equipment (UE) for storage;

a searching module, configured to determine CSI-RS configuration information to be notified, and searching, in the mapping relation between the CSI-RS configuration information code and the CSI-RS configuration information, for a CSI-RS configuration information code corresponding to the CSI-RS configuration information to be notified, where the mapping relation between the CSI-RS configuration information code and the CSI-RS configuration information is stored by the storing module; and a second sending module, configured to send the CSI-RS configuration information code found by the searching module to the UE, so that the UE determines CSI-RS configuration information according to the received CSI-RS configuration information code and the mapping relation between the CSI-RS configuration information code and the CSI-RS configuration information, where the mapping relation between the CSI-RS configuration information code and the CSI-RS configuration information is pre-stored by the UE.

The technical solutions provided by the embodiments of the present disclosure have the following beneficial effects:

Because the CSI-RS is characterized by a small overhead, a long period, a high reuse factor, and low port pilot patterns nested in a high port pilot pattern, the CSI-RS configuration information is notified to the UE in the form of the CSI-RS configuration information code, so that the UE determines the CSI-RS configuration information according to the CSI-RS configuration information code, thus not only lowering the overhead, but also ensuring that the CSI-RSs of multiple cells do not collide with each other.

DETAILED DESCRIPTION OF THE EMBODIMENTS

In order to make the objectives, technical solutions, and advantages of the present disclosure more clearly, embodiments of the present disclosure are further described in detail below with reference to the accompanying drawings.

Embodiment 1

Figure 1:
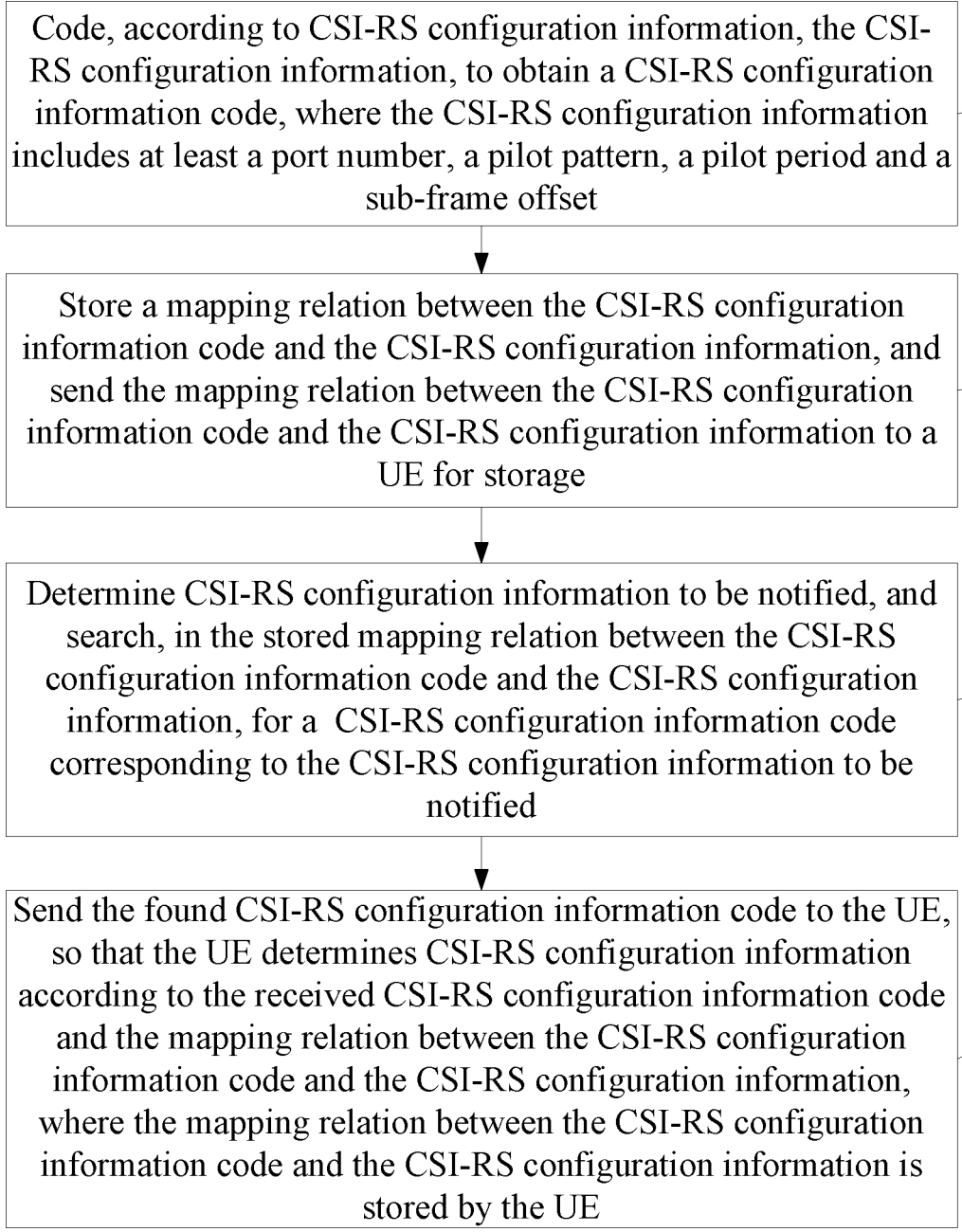
FIG. 1 is a flow chart of a method for notifying reference signal configuration information according to Embodiment 1 of the present disclosure.

Referring to FIG. 1, this embodiment provides a method for notifying reference signal configuration information, where a process of the method is specifically as follows:

101: Code, according to channel state information-reference signal (CSI-RS) configuration information, the CSI-RS configuration information, to obtain a CSI-RS configuration information code, where the CSI-RS configuration information includes at least the number of ports, a pilot pattern, a pilot period and a sub-frame offset.

102: Store a mapping relation between the CSI-RS configuration information code and the CSI-RS configuration information, and send the mapping relation between the CSI-RS configuration information code and the CSI-RS configuration information to a UE for storage.

103: Determine CSI-RS configuration information to be notified, and search, in the stored mapping relation between the CSI-RS configuration information code and the CSI-RS configuration information, for a CSI-RS configuration information code corresponding to the CSI-RS configuration information to be notified.

104: Send the found CSI-RS configuration information code to the UE, so that the UE determines CSI-RS configuration information according to the received CSI-RS configuration information code and the mapping relation between the CSI-RS configuration information code and the CSI-RS configuration information, where the mapping relation between the CSI-RS configuration information code and the CSI-RS configuration information is stored by the UE.

In the method provided by this embodiment, because the CSI-RS is characterized by a small overhead, a long period, a high reuse factor, and low port pilot patterns nested in a high port pilot pattern, the CSI-RS configuration information is notified to the UE in the form of the CSI-RS configuration information code, so that the UE determines the CSI-RS configuration information according to the CSI-RS configuration information code, thus not only lowering the overhead, but also ensuring that the CSI-RSs of multiple cells do not collide with each other.

Embodiment 2

This embodiment provides a method for notifying reference signal configuration information. Because a CSI-RS is characterized by a small overhead, a long period, a high reuse factor, and low port pilot patterns nested in a high port pilot pattern, in this embodiment, CSI-RS configuration information is coded, and the CSI-RS configuration information is notified to a UE in the form of a CSI-RS configuration information code, so that the UE determines CSI-RS configuration information, thus not only lowering an overhead, but also ensuring that CSI-RSs of multiple cells do not collide with each other.

A device for notifying reference signal configuration information is a network device, and the CSI-RS configuration information includes, but is not limited to, the number of ports, a pilot pattern, a pilot period and a sub-frame offset.

If a CSI-RS of a cell collides with a data symbol sent by a strong interfering cell, the network device may require that at a position of the CSI-RS sent by the cell, strong interfering cells all perform data muting processing so as to avoid interfering with a reference signal. In this case, the cell needs to notify every strong interfering cell of the reference signal position of the CSI-RS (including the pilot period and the pilot pattern). Additionally, the network device further needs to notify the UE of a data muting position of the CSI-RS, so that the UE assumes that no data symbol is transmitted at this position, a receiver does not detect data at this position, and the UE estimates a downlink channel corresponding to the cell at this position. In the case that the network device supports a data muting technology, the CSI-RS configuration information not only includes the number of ports, the pilot pattern, the pilot period and the sub-frame offset, but also includes the data muting position.

If the network device further supports partial data muting on the basis of supporting data muting, the network device also needs to notify the UE of a data muting period and a data muting offset. In this case, the CSI-RS configuration information not only includes the number of ports, the pilot pattern, the pilot period, the sub-frame offset and the data muting position, but also includes the data muting period and the data muting offset.

Figure 2:
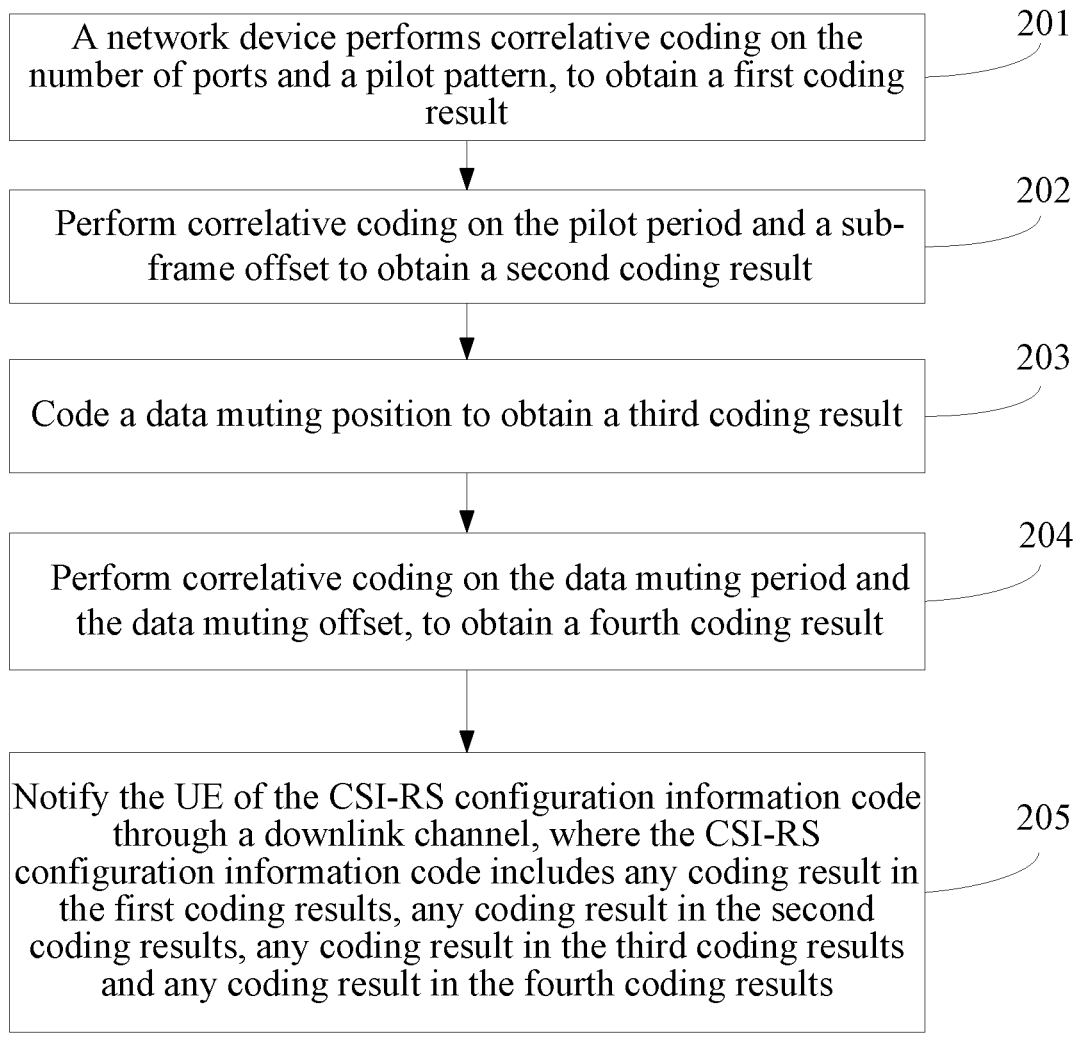
FIG. 2 is a flow chart of a method for notifying reference signal configuration information according to Embodiment 2 of the present disclosure.

An example that the network device not only supports the data muting technology but also supports a partial data muting technology is given below to illustrate the method provided by this embodiment in detail. In this case, the CSI-RS configuration information not only includes the number of ports, the pilot pattern, the pilot period, the sub-frame offset and the data muting position, but also includes the data muting period and the data muting offset. Referring to FIG. 2, a process of the method provided by this embodiment is specifically as follows:

201: The network device performs correlative coding on the number of ports and the pilot pattern, to obtain a first coding result.

The number of ports of the CSI-RS may be 2, 4 or 8, and possible pilot patterns are as shown in Table 1 corresponding to different numbers of ports and different sub-frame configurations.

TABLE 1

| The Number of Ports of the CSI-RS | 2 | 4 | 8 |
|---|---|---|---|
| The available number of pilot patterns of the CSI-RS for an ordinary CP | 20 | 10 | 5 |
| The available number of pilot patterns of the CSI-RS for an ordinary CP w/o CRS ports 2/3 | 32 | 16 | 8 |
| The available number of pilot patterns of the CSI-RS for an extended CP | 16 | 8 | 4 |
| The available number of pilot patterns of the CSI-RS for an extended CP w/o CRS ports 2/3 | 28 | 14 | 7 |

As shown in Table 1, the possible pilot patterns corresponding to different numbers of ports may respectively be 32 types (2 ports), 16 types (4 ports), and 8 types (8 ports) at most. In general, 32+16+8=56 types of possible combinations of the number of ports and the pilot patterns exist at most. When the correlative coding is performed on the number of ports and the pilot pattern, any one of the following two manners may be adopted.

In a first manner, joint coding is performed on the number of ports and the pilot pattern by using 6 bits.

6-bit signaling may indicate 64 types of states, in which any 56 types of states may be used and are one-to-one corresponding to the 56 types of combinations of the number of ports and the pilot patterns, and a mapping table is established. Therefore, the UE may obtain the number of ports of the CSI-RS and the pilot pattern of the CSI-RS through receiving the 6-bit signaling and looking up in the mapping table.

Specifically, considering that when the number of ports is respectively 2, 4 or 8, the pilot pattern of the CSI-RS has the nesting property, that is, each 8-port pilot pattern may be nested with two 4-port pilot patterns, and each 4-port pilot pattern may be nested with two 2-port pilot patterns, if the 8-port pilot pattern is divided into a front half part and a rear half part, each part forms a 4-port pilot pattern; and if the 4-port pilot pattern is divided into a front half part and a rear half part, each part forms a 2-port pilot pattern. Based on such nesting property, the mapping relation between the number of ports and the pilot pattern may be determined through the following two steps.

In a first step, a corresponding relation between the three least significant bits and eight types of the 8-port pilot patterns is established. The corresponding relation between the three least significant bits and the 8-port pilot patterns is not specifically limited in this embodiment, and the corresponding relation shown in Table 2 is only used as an example for illustration.

TABLE 2

| 8-port Pilot Pattern | Code |
|---|---|
| First type of the 8-port pilot pattern | 000 |
| Second type of the 8-port pilot pattern | 001 |
| Third type of the 8-port pilot pattern | 010 |
| Fourth type of the 8-port pilot pattern | 011 |
| Fifth type of the 8-port pilot pattern | 100 |
| Sixth type of the 8-port pilot pattern | 101 |
| Seventh type of the 8-port pilot pattern | 110 |
| Eighth type of the 8-port pilot pattern | 111 |

When the number of ports is 2 or 4, the three least significant bits indicate the 8-port pilot pattern that can be nested with the designated pilot patterns. The serial numbers of the corresponding 8-port pilot patterns in the mapping table are as shown in FIG. 3 to FIG. 6.

In a second step, when the number of ports is 8, the three most significant bits are 110.

When the number of ports is 4, the two most significant bits are 10, and the $3^{rd}$ bit indicates the position of the 4-port pilot pattern in the nested 8-port pilot pattern, where 0 indicates the front half part and 1 indicates the rear half part.

When the number of ports is 2, the one most significant bit is 0, and the $2^{nd}$ bit indicates the position of the 2-port pilot pattern in the nested 4-port pilot pattern, where 0 indicates the front half part and 1 indicates the rear half part.

If no CSI-RS exists, "111111" may be used for marking, and the specific mapping relation is as shown in Table 3.

TABLE 3

| | Bit | | | | | |
|---|---|---|---|---|---|---|
| | $1^{st}$ | $2^{nd}$ | $3^{rd}$ | $4^{th}$ | $5^{th}$ | $6^{th}$ |
| 2 ports | 0 | 0: the front half part of the 4-port pattern<br>1: the rear half part of the 4-port pattern | 0: the front half part of the 8-port pattern<br>1: the rear half part of the 8-port pattern | x | x | x |
| 4 ports | 1 | 0 | 0: the front half part of the 8-port pattern<br>1: the rear half part of the | x | x | x |

TABLE 3-continued

| | Bit | | | | | |
|---|---|---|---|---|---|---|
| | 1st | 2nd | 3rd | 4th | 5th | 6th |
| | | | 8-port pattern | | | |
| 8 ports | 1 | 1 | 0 | x | x | x |
| No CSI-RS | 1 | 1 | 1 | 1 | 1 | 1 |

The "x" in the three least significant bits in Table 3 indicates a corresponding relation established with the eight types of the 8-port pilot patterns, and in an example that a joint coding result of the number of ports and the pilot pattern is 100101, because the three most significant bits in the coding result are 100, it can be seen from Table 3 that, the number of ports corresponding to the coding result is 4, and the 4 ports form the front half part of the 8-port pattern. Further, because the three least significant bits in the coding result are 101, it can be seen from Table 2 that, the fifth type of the 8-port pilot pattern is indicated.

In a second manner, the number of ports and the pilot pattern are respectively coded.

In practical application, the number of ports is implicitly encoded to a cyclic redundancy check (CRC) code of an $x^{th}$ SIB, and the pilot pattern is indicated by 5-bit signaling.

The $x^{th}$ system information block is a system information block used to configure CSI-RS information. Based on the nesting property of the CSI-RS, a mapping relation between the 5-bit signaling and the pilot pattern may be obtained through the following two steps.

In a first step, a one-to-one corresponding relation is established between the three least significant bits and the eight types of the 8-port pilot patterns, and when the number of ports is 2 or 4, the three bits indicate the 8-port pilot pattern in which the designated pilot patterns can be nested.

In a second step, when the number of ports is 8, the two most significant bits are any combination of 0 and 1.

When the number of ports is 4, the one most significant bit is any one of 0 and 1, and the $2^{nd}$ bit indicates the position of the 4-port pilot pattern in the nested 8-port pilot pattern, where 0 indicates the front half part and 1 indicates the rear half part.

When the number of ports is 2, the $1^{st}$ bit indicates the position of the 2-port pilot pattern in the nested 4-port pilot pattern, where 0 indicates the front half part and 1 indicates the rear half part.

In this embodiment, the pilot pattern may be divided into different pilot pattern groups according to the front half part and the rear half part. For example, the 2-port pilot pattern may be divided into two pilot pattern groups according to the front half part and the rear half part of the 4-port pilot pattern, and in this case, the $2^{nd}$ bit in the first manner of performing correlative coding on the number of ports and the pilot pattern and the $1^{st}$ bit in the second manner may indicate the pilot pattern group to which the pilot pattern belongs.

Further, the foregoing two pilot pattern groups are subdivided into four pilot pattern groups according to the front half part and the rear half part of the 8-port pilot pattern, and in this case, the $2^{nd}$ bit and the $3^{rd}$ bit in the first manner and the $1^{st}$ bit and the $2^{nd}$ bit in the second manner may indicate the pilot pattern group to which the pilot pattern belongs. In another example, the 4-port pilot pattern may be divided into two pilot pattern groups according to the front half part and the rear half part of the 8-port pilot pattern, and in this case, the $3^{rd}$ bit in the first manner and the $2^{nd}$ bit in the second manner may indicate the pilot pattern group to which the pilot pattern belongs.

It should be noted that, the front half part of the 8-port pilot pattern in this embodiment refers to the leading part of the 8-port pilot pattern when the 8-port pilot pattern is divided into two parts according to the 4-port pilot patterns in which the 8-port pilot pattern is nested, and may be the front half part of the entire 8-port pilot pattern, and may also be the front half part of each half of the 8-port pilot pattern. For example, the pilot pattern labeled 0 in FIG. 3 has four rows from top to bottom, the first two rows may be referred to as the front half part, or the first row in the first two rows and the first row in the following two rows are collectively referred to as the front half part, which is not specifically limited in this embodiment. The definition of the front half part of the 4-port pilot pattern is the same as that of the front half part of the 8-port pilot period, which is also not specifically limited in this embodiment. No matter which manner is adopted to perform the correlative coding on the number of ports and the pilot pattern, the obtained coding result is collectively referred to as the first coding result, and to specify the number of ports and the pilot pattern that correspond to each coding result, the network device also needs to establish a corresponding relation between the first coding result and the number of ports and the pilot pattern after obtaining the first coding result.

202: Perform correlative coding on the pilot period and the sub-frame offset to obtain a second coding result.

The pilot period of the CSI-RS is a multiple of 5 ms. Assume that the period of the CSI-RS is 5N ms, where N is a positive integer and the value of N is determined by the R10 specification, and each millisecond corresponds to one sub-frame. The sub-frame offset refers to a sub-frame offset of the sub-frame, where the sub-frame carries the CSI-RS, relative to a reference sub-frame (that is, the first sub-frame in the 5N sub-frames) in a certain period of the CSI-RS. Because it is specified in the R10 specification that the $0^{th}$ and the $4^{th}$ sub-frame of every five sub-frames may need to carry information such as a synchronous channel, a broadcast channel, and a paging channel, these sub-frames cannot carry the CSI-RS, so that 3N types of possible sub-frame offsets corresponding to the 5N ms period of the CSI-RS exist at most.

The pilot period of the CSI-RS and the sub-frame offset of the CSI-RS may be coded in any one of the following two manners.

In a first manner, the pilot period of the CSI-RS and the sub-frame offset of the CSI-RS are respectively coded.

Assume that the value of N is {1, 2, 3, 4, 5, 6, 7, 8}, and 3 bits are needed to indicate the period of the CSI-RS. For the sub-frame offset, when N=8, 24 types of possible sub-frame offsets exist at most, and 5 bits are needed to indicate the sub-frame offset of the CSI-RS. Altogether 3+5=8 bits are needed to indicate the pilot period of the CSI-RS and the sub-frame offset of the CSI-RS.

In a second manner, joint coding is performed on the pilot period of the CSI-RS and the sub-frame offset of the CSI-RS.

Assume that the value of N is {1, 2, 3, 4, 5, 6, 7, 8}, and 3 bits are needed to indicate the period of the CSI-RS. Corresponding to each type of the pilot period of the CSI-RS, the possible sub-frame offsets are respectively {3, 6, 9, 12, 15, 18, 21, 24}, altogether 3+6+9+12+15+18+21+24=108 types of different combinations of the pilot periods and the sub-frame offsets exist, and altogether 7 bits are needed to indicate the pilot period of the CSI-RS and the sub-frame offset of the CSI-RS. The 7 bits may have 128 types of states, in which any 108 types of states may be selected and are one-to-one corresponding to the 108 types of combinations of the pilot periods and the sub-frame offsets, and a mapping table between the 108 types of states and the 108 types of combinations of the pilot periods and the sub-frame offsets is established. After receiving the 7 bits, the UE may obtain corresponding pilot period and sub-frame offset information through looking up in the table.

Preferably, in order to further reduce a signaling overhead, the possible values of the sub-frame offset may be limited. For example, it is required that only the first five sub-frames of every 5N sub-frames may carry the CSI-RS, and in this case, for any pilot period of the CSI-RS, three possible values of the sub-frame offset exist at most, that is, {1, 2, 3}. In this case, the pilot period of the CSI-RS and the sub-frame offset of the CSI-RS may also be coded through the foregoing two manners. When the first manner is used for coding, 3+2=5 bits are needed; and when the second manner is used for coding, 5 bits are needed.

The possible values of N are diversified, and the pilot period of the CSI-RS and the sub-frame offset of the CSI-RS may be coded through the foregoing two manners. The specific value of N is not limited in this embodiment.

No matter which manner is adopted to perform the correlative coding on the number of ports and the pilot pattern, the obtained coding result is collectively referred to as the second coding result, and in order to specify the pilot period and the specific sub-frame offset that correspond to each coding result, the network device also needs to establish a corresponding relation between the second coding result and the pilot period and the sub-frame offset after obtaining the second coding result.

203: Code the data muting position to obtain a third coding result.

In this step, the network device indicates, by using a bitmap manner, the position of a muted resource element (RE) in an orthogonal frequency division multiplexing (OFDM) symbol where a serving cell CSI-RS is located.

In practical application, part of the position information for performing data muting may be implicitly carried in the position information of the serving cell CSI-RS. Specifically, the serving cell may only perform data muting on the OFDM symbol and the sub-frame carrying the CSI-RS, so that the sub-frame offset of data muting is the same as the sub-frame offset of the CSI-RS, and does not need to be separately notified; and the position of the OFDM symbol of data muting is the same as the OFDM symbol where the pilot pattern of the CSI-RS is located, and also does not need to be separately notified.

Figure 3:
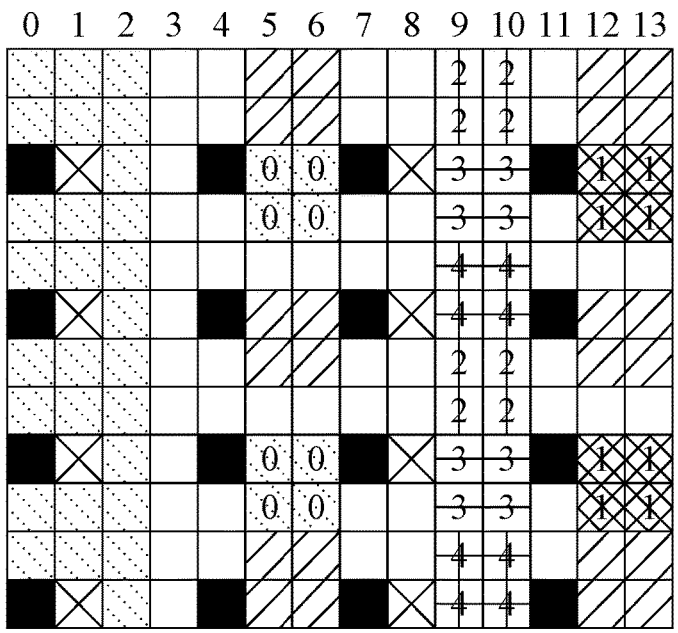
FIG. 3 is a schematic diagram of a first type of pilot patterns according to Embodiment 2 of the present disclosure.
Figure 4:
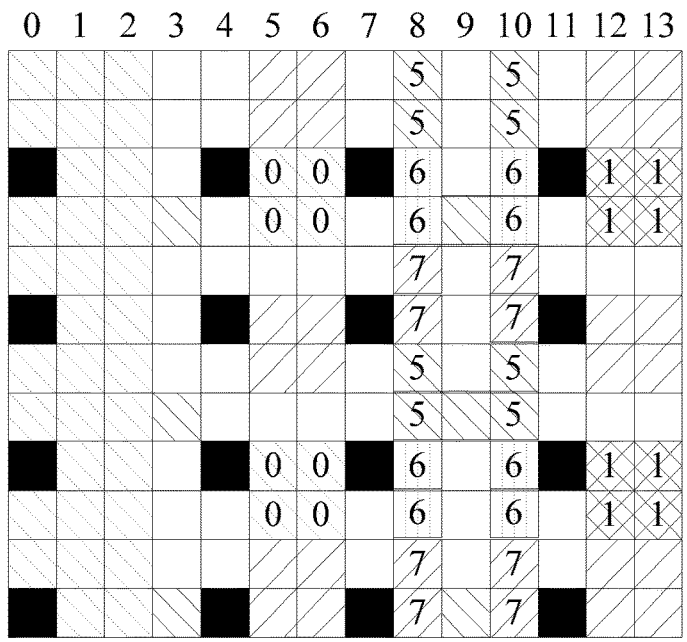
FIG. 4 is a schematic diagram of a second type of pilot patterns according to Embodiment 2 of the present disclosure.
Figure 5:
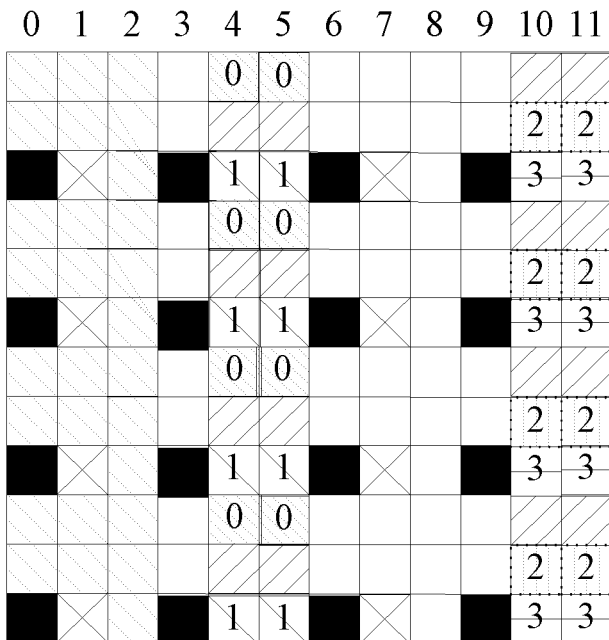
FIG. 5 is a schematic diagram of a third type of pilot patterns according to Embodiment 2 of the present disclosure.
Figure 6:
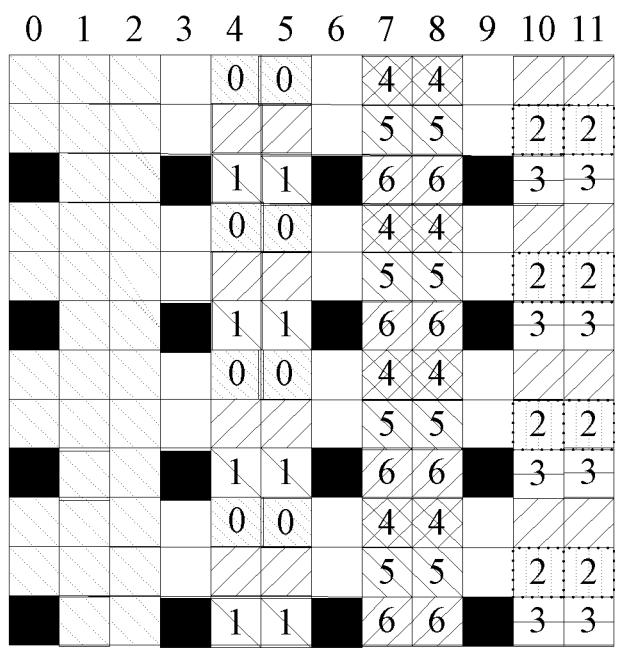
FIG. 6 is a schematic diagram of a fourth type of pilot patterns according to Embodiment 2 of the present disclosure.

Specifically, in an example that the network device uses 12 bits to indicate, in the bitmap manner, the position of the muted RE in the OFDM symbol where the serving cell CSI-RS is located, the 12 bits indicating the muted RE respectively correspond to the twelve 2-port pilot patterns on the same OFDM symbol, as shown in the $9^{th}$ and the $10^{th}$ OFDM symbols in FIG. 3, where each pilot pattern includes a pair of REs, a bit being 1 indicates that the corresponding RE needs to be muted, and a bit being 0 indicates that the corresponding RE does not need to be muted.

To further reduce the overhead, the network device may use K bits to indicate, in the bitmap manner, the position of the muted RE in the OFDM symbol where the serving cell CSI-RS is located, where K≤12. In this case, K is determined by factors such as the maximum number of pilot patterns on the OFDM symbol carrying the serving cell CSI-RS, the muting range, and the muting pilot pattern.

Taking FIG. 3 as an example, if the serving cell CSI-RS is at the $5^{th}$ and the $6^{th}$ OFDM symbols, and the OFDM symbols include four types of 2-port pilot patterns, then K may be set to 4, and in this case, the four bits indicating the muted RE respectively correspond to the four 2-port pilot patterns on the $5^{th}$ and the $6^{th}$ OFDM symbols, where a bit being 1 indicates that the corresponding RE needs to be muted, and a bit being 0 indicates that the corresponding RE does not need to be muted.

If the network side specifies the muting set or muting range, the data muting may only occur in the muting set or muting range to which the serving cell CSI-RS belongs, and in this case, the muting set or muting range may be notified in other manners, which is not specifically limited in the embodiment of the present disclosure. Referring to FIG. 3, if the serving cell CSI-RS is on the $9^{th}$ and the $10^{th}$ OFDM symbols, the muting range is limited in the RE labeled 2, and these REs include four types of 2-port pilot patterns, K may be set to 4, and in this case, the four bits indicating the muted RE respectively correspond to the four 2-port pilot patterns included in the RE labeled 2 on the $9^{th}$ and the $10^{th}$ OFDM symbols, where a bit being 1 indicates that the corresponding RE needs to be muted, and a bit being 0 indicates that the corresponding RE does not need to be muted.

Taking FIG. 3 as an example, if the serving cell CSI-RS is on the $9^{th}$ and the $10^{th}$ OFDM symbols, and the OFDM symbols include six types of 4-port pilot patterns, K may be set to 6, and in this case, the 6 bits indicating the muted RE respectively correspond to the six 4-port pilot patterns on the $9^{th}$ and the $10^{th}$ OFDM symbols, where each pilot pattern includes two pairs of REs, a bit being 1 indicates that the corresponding RE needs to be muted, and a bit being 0 indicates that the corresponding RE does not need to be muted.

The possible values of K are diversified, and the position of the muted RE in the OFDM symbol where the serving cell CSI-RS is located may be indicated in the bitmap manner. The specific value of K is not limited in this embodiment.

No matter which manner is used to code the data muting position, the obtained coding result is collectively referred to as the third coding result, and in order to specify the data muting position corresponding to each coding result, the network device also needs to establish a corresponding relation between the third coding result and the data muting position after obtaining the third coding result.

204: Perform correlative coding on the data muting period and the data muting offset, to obtain a fourth coding result.

In this step, the partial data muting refers to not muting all the data REs that collide with the CSI-RS, for example, the CSI-RS is sent every 5 ms, and the data muting occurs every 15 ms; in this case, the network device also needs to notify the UE of the data muting period and the data muting sub-frame offset. Because the data muting may only be performed on the OFDM symbol and the sub-frame carrying the CSI-RS, the data muting period is a positive integer multiple of the period of the CSI-RS, and assume that the data muting period is 5NM ms. In the period of 5NM ms, the network device may send the CSI-RS for M times, and the data muting may occur on the CSI-RS sub-frame sent at any time, so that the offset of data muting, that is, the data muting offset, also needs to be notified.

The data muting period and the data muting offset may be coded by using any one of the following two manners.

In a first manner, the data muting period and the data muting offset are respectively coded.

Assume that the value of M is {1, 2, 3, 4, 5}, and 3 bits are needed to indicate the data muting period of the CSI-RS. For the data muting offset, when N=5, 5 types of possible data muting offsets exist at most, and 3 bits are needed to indicate the data muting offset of the CSI-RS. Altogether 3+3=6 bits are needed to indicate the data muting period of the CSI-RS and the data muting offset of the CSI-RS.

In a second manner, joint coding is performed on the data muting period and the data muting offset.

Assume that the value of M is {1, 2, 3, 4, 5}, and corresponding to each type of the data muting period, the possible data muting offsets are respectively {1, 2, 3, 4, 5}, altogether 1+2+3+4+5=15 types of different combinations of the data muting periods and the data muting offsets exist, and 4 bits are needed to indicate the data muting period of the CSI-RS and the data muting offset of the CSI-RS. The 4 bits may have 16 types of states, in which any 15 types of states may be selected and are one-to-one corresponding to the 15 types of combinations of the data muting periods and the data muting offsets, and a mapping table between the 15 types of states and the 15 types of combinations of the data muting periods and the data muting offsets is established. After receiving the 4 bits, the UE may obtain the corresponding data muting period and data muting offset information through looking up in the table.

Preferably, in order to further reduce the signaling overhead, the possible values of the data muting offset are limited. For example, in the period of 5NM ms, the network device may send the CSI-RS for M times, and the data muting may only occur on the CSI-RS sub-frame sent at the first time; in this case, for any data muting period, only one possible value of the data muting offset exists, and the muting offset does not need to be notified. In this case, only the data muting period needs to be coded, and assuming that the value of M is {1, 2, 3, 4, 5}, 3 bits are needed.

The possible values of M are diversified, and the data muting period of the CSI-RS and the data muting offset of the CSI-RS may be coded through the foregoing two manners. In this embodiment, the specific values of M and N are not limited.

No matter which manner is used to perform correlative coding on the data muting period and the data muting offset, the obtained coding result is collectively referred to as the fourth coding result, and in order to specify the data muting period and the data muting offset that correspond to each coding result, the network device also needs to establish a corresponding relation between the fourth coding result and the data muting period and the data muting offset after obtaining the fourth coding result.

Further, through the foregoing steps 201 to 204, after the network device obtains the first, second, third and fourth coding results, in order to avoid repeatedly performing the coding operation when notifying the CSI-RS configuration information each time, the network device also needs to store the corresponding relation between the first coding result and the number of ports and the pilot pattern, the corresponding relation between the second coding result and the pilot period and the sub-frame offset, the corresponding relation between the third coding result and the data muting position, and the corresponding relation between the fourth coding result and the data muting period and the data muting offset, so that after determining CSI-RS configuration information to be notified, the network device only needs to search, in the stored mapping relation, for a CSI-RS configuration information code corresponding to the CSI-RS configuration information to be notified, and send the CSI-RS configuration information code to the UE.

205: Notify the UE of the CSI-RS configuration information code through a downlink channel, where the CSI-RS configuration information code is any coding result in the first coding results, any coding result in the second coding results, any coding result in the third coding results and any coding result in the fourth coding results.

In this step, in order to enable the UE that receives the CSI-RS configuration information code to determine, according to the received CSI-RS configuration information code, the corresponding CSI-RS configuration information, the network device also needs to send the mapping relation to the UE for storage after the network device stores the mapping relation between the CSI-RS configuration information code and the CSI-RS configuration information, so that the UE determines CSI-RS configuration information according to the received CSI-RS configuration information code and the mapping relation between the CSI-RS configuration information code and the CSI-RS configuration information, where the mapping relation between the CSI-RS configuration information code and the CSI-RS configuration information is stored by the UE.

Specifically, manners for sending the CSI-RS configuration information code may include, but not limited to, the following:

In a first manner, add a bit used to carry the CSI-RS configuration information code in a system information block of a broadcast channel, for example, add a corresponding bit used to carry the CSI-RS information in the second system information block (SIB2) of the broadcast channel.

In a second manner, use a remaining bit in a master information block (MIB) to carry the CSI-RS configuration information code in the broadcast channel, for example, use 10 remaining bits in the master information block to carry the CSI-RS information in the broadcast channel.

In a third manner, define a new system information block used to carry the CSI-RS configuration information code in the broadcast channel, for example, define the $x^{th}$ system information block (SIBx) used to carry the CSI-RS information in the broadcast channel, where information of the number of ports may be implicitly encoded to the CRC of the SIBx, and the specific value of x is not limited in this embodiment.

In a fourth manner, a unicast channel is used to carry the CSI-RS configuration information code, for example, a downlink control is used channel to carry the CSI-RS configuration information.

Till now, after the CSI-RS configuration information code is notified to the UE through a downlink channel, the UE may determine, according to the CSI-RS configuration information code and the mapping relation between the CSI-RS configuration information code and the CSI-RS configuration information, where the mapping relation between the CSI-RS configuration information code and the CSI-RS configuration information is stored by the UE, the specific CSI-RS configuration information sent by the network device, and determine, according to the CSI-RS configuration information, the position of the CSI-RS, thus performing operations such as downlink channel estimation.

It should be noted that, the "1" and "0" in the coding manners descried in the foregoing steps may be equivalently replaced, which is not specifically limited in this embodiment.

Further, in steps 201 to 204, combined coding is performed on all the information in the CSI-RS configuration information to code the CSI-RS configuration information, and in practical application, joint coding may also be performed on all the information in the CSI-RS configuration information.

When the CSI-RS configuration information includes the number of ports, the pilot pattern, the pilot period and the sub-frame offset, joint coding may be performed on the number of ports, the pilot pattern, the pilot period and the sub-frame offset that are in the CSI-RS configuration information, a first joint coding result is obtained, and a mapping relation between the first joint coding result and the number of ports, the pilot pattern, the pilot period and the sub-frame offset that are in the CSI-RS configuration information is established, where the CSI-RS configuration information code sent to the UE is one of the first joint coding results.

When the network device supports the data muting technology, and the CSI-RS configuration information not only includes the number of ports, the pilot pattern, the pilot period and the sub-frame offset, but also includes the data muting position, joint coding is performed on the number of ports, the pilot pattern, the pilot period, the sub-frame offset and the data muting position that are in the CSI-RS configuration information, a second joint coding result is obtained, and a mapping relation between the second joint coding result and the number of ports, the pilot pattern, the pilot period, the sub-frame offset and the data muting position that are in the CSI-RS configuration information is established, where the CSI-RS configuration information code sent to the UE is one of the second joint coding results.

When the network device supports the partial muting technology, and the CSI-RS configuration information not only includes the number of ports, the pilot pattern, the pilot period, the sub-frame offset and the data muting position, but also includes the data muting period and the data muting offset, joint coding is performed on the number of ports, the pilot pattern, the pilot period, the sub-frame offset, the data muting position, the data muting period and the data muting offset that are in the CSI-RS configuration information, a third joint coding result is obtained, and a mapping relation between the third joint coding result and the number of ports, the pilot pattern, the pilot period, the sub-frame offset, the data muting position, the data muting period and the data muting offset that are in the CSI-RS configuration information is established, where the CSI-RS configuration information code sent to the UE is one of the third joint coding results.

In the method provided by this embodiment, because the CSI-RS is characterized by a small overhead, a long period, a high reuse factor, and low port pilot patterns nested in a high port pilot pattern, the CSI-RS configuration information is notified to the UE in the form of the CSI-RS configuration information code, so that the UE determines the CSI-RS configuration information according to the CSI-RS configuration information code, thus not only lowering the overhead, but also ensuring that the CSI-RSs of multiple cells do not collide with each other. Further, if the network device supports the muting technology, the information such as the data muting position, the data muting period and the data muting offset is notified to the UE, so that the CSI-RS is prevented from colliding with the data symbol sent by the strong interfering cell.

Embodiment 3

Figure 7:
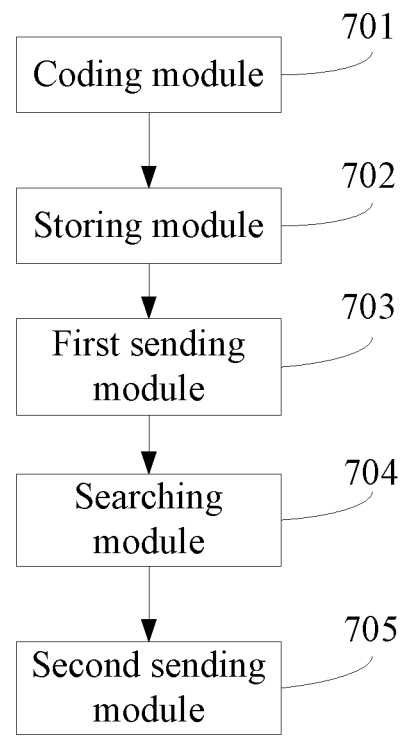
FIG. 7 is a schematic structural diagram of a device for notifying reference signal configuration information according to Embodiment 3 of the present disclosure.

Referring to FIG. 7, this embodiment provides a device for notifying reference signal configuration information, where the device includes:

a coding module 701, configured to code, according to channel state information-reference signal (CSI-RS) configuration information, the CSI-RS configuration information, to obtain a CSI-RS configuration information code, where the CSI-RS configuration information includes at least the number of ports, a pilot pattern, a pilot period and a sub-frame offset;

a storing module 702, configured to store a mapping relation between the CSI-RS configuration information code obtained by the coding module 701 and the CSI-RS configuration information;

a first sending module 703, configured to send the mapping relation between the CSI-RS configuration information code and the CSI-RS configuration information to a user equipment (UE) for storage, where the mapping relation between the CSI-RS configuration information code and the CSI-RS configuration information is stored by the storing module 702;

a searching module 704, configured to determine CSI-RS configuration information to be notified, and search, in the mapping relation between the CSI-RS configuration information code and the CSI-RS configuration information, for a CSI-RS configuration information code corresponding to the CSI-RS configuration information to be notified, where the mapping relation between the CSI-RS configuration information code and the CSI-RS configuration information is stored by the storing module 702; and a second sending module 705, configured to send the CSI-RS configuration information code found by the searching module 704 to the UE, so that the UE determines CSI-RS configuration information according to the received CSI-RS configuration information code and the mapping relation between the CSI-RS configuration information code and the CSI-RS configuration information, where the mapping relation between the CSI-RS configuration information code and the CSI-RS configuration information is stored by the UE.

Figure 8:
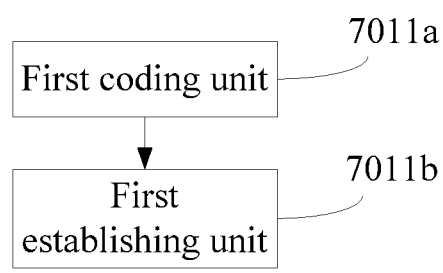
FIG. 8 is a schematic structural diagram of a first type of a coding module according to Embodiment 3 of the present disclosure.

Referring to FIG. 8, the coding module 701 includes:

a first coding unit 7011*a*, configured to perform joint coding on the number of ports, the pilot pattern, the pilot period and the sub-frame offset that are in the CSI-RS configuration information, to obtain a first joint coding result; and a first establishing unit 7011*b*, configured to establish a mapping relation between the first joint coding result obtained by the first coding unit 7011*a* and the number of ports, the pilot pattern, the pilot period and the sub-frame offset that are in the CSI-RS configuration information, where correspondingly, the CSI-RS configuration information code sent by the second sending module 705 is one of the first joint coding results.

Figure 9:
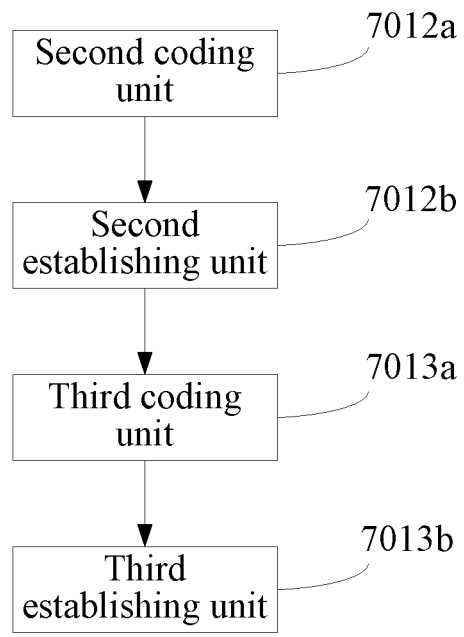
FIG. 9 is a schematic structural diagram of a second type of a coding module according to Embodiment 3 of the present disclosure.

Optionally, referring to FIG. 9, the coding module 701 includes:

a second coding unit 7012*a*, configured to perform correlative coding on the number of ports and the pilot pattern that are in the CSI-RS configuration information, to obtain a first coding result;

a second establishing unit 7012*b*, configured to establish a mapping relation between the first coding result obtained by the second coding unit 7012*a* and the number of ports and the pilot pattern that are in the CSI-RS configuration information;

a third coding unit 7013*a*, configured to perform correlative coding on the pilot period and the sub-frame offset that are in the CSI-RS configuration information, to obtain a second coding result; and a third establishing unit 7013*b*, configured to establish a mapping relation between the second coding result obtained by the third coding unit 7013*a* and the pilot period and the sub-frame offset that are in the CSI-RS configuration information, where correspondingly, the CSI-RS configuration information code sent by the second sending module 705 is any coding result in the first coding results and any coding result in the second coding results.

In addition, when the device for notifying reference signal configuration information supports a data muting technology, the CSI-RS configuration information further includes a data muting position.

Figure 10:
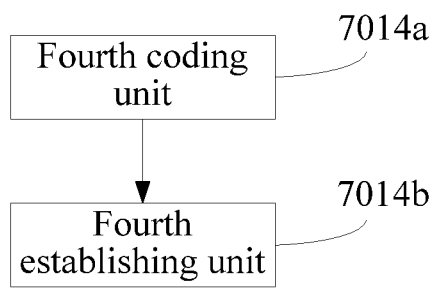
FIG. 10 is a schematic structural diagram of a third type of a coding module according to Embodiment 3 of the present disclosure.

Correspondingly, referring to FIG. 10, the coding module 701 includes:

a fourth coding unit 7014*a*, configured to perform joint coding on the number of ports, the pilot pattern, the pilot period, the sub-frame offset and the data muting position that are in the CSI-RS configuration information, to obtain a second joint coding result; and a fourth establishing unit 7014*b*, configured to establish a mapping relation between the second joint coding result obtained by the fourth coding unit 7014*a* and the number of ports, the pilot pattern, the pilot period, the sub-frame offset and the data muting position that are in the CSI-RS configuration information, where the CSI-RS configuration information code sent by the second sending module 705 is one of the second joint coding results.

Figure 11:
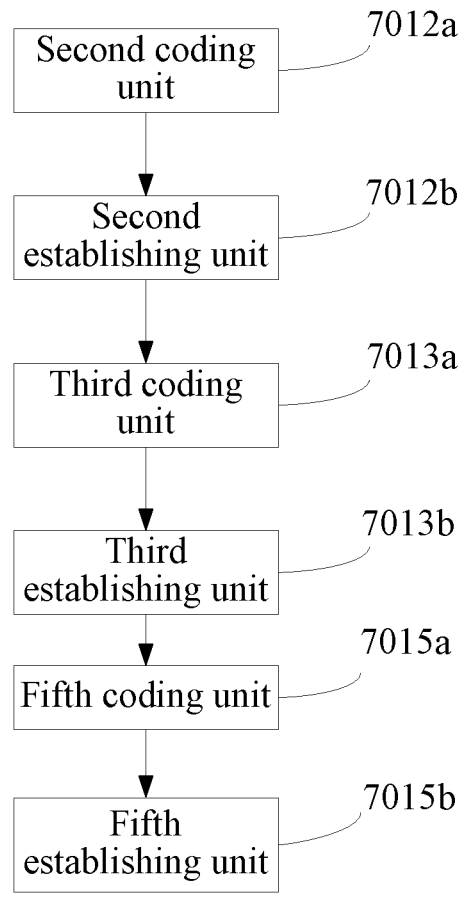
FIG. 11 is a schematic structural diagram of a fourth type of a coding module according to Embodiment 3 of the present disclosure.

Optionally, referring to FIG. 11, the coding module 701 includes:

a second coding unit 7012*a*, configured to perform correlative coding on the number of ports and the pilot pattern that are in the CSI-RS configuration information, to obtain a first coding result;

a second establishing unit 7012*b*, configured to establish a mapping relation between the first coding result obtained by the second coding unit 7012*a* and the number of ports and the pilot pattern that are in the CSI-RS configuration information;

a third coding unit 7013*a*, configured to perform correlative coding on the pilot period and the sub-frame offset that are in the CSI-RS configuration information, to obtain a second coding result;

a third establishing unit 7013*b*, configured to establish a mapping relation between the second coding result obtained by the third coding unit 7013*a* and the pilot period and the sub-frame offset that are in the CSI-RS configuration information;

a fifth coding unit 7015*a*, configured to code the data muting position in the CSI-RS configuration information, to obtain a third coding result; and a fifth establishing unit 7015*b*, configured to establish a mapping relation between the third coding result obtained by the fifth coding unit 7015*a* and the data muting position in the CSI-RS configuration information, where the CSI-RS configuration information code sent by the second sending module 705 is any coding result in the first coding results, any coding result in the second coding results and any coding result in the third coding results.

In addition, when the device for notifying reference signal configuration information further supports a partial data muting technology, the CSI-RS configuration information further includes a data muting position, a data muting period and a data muting offset.

Figure 12:
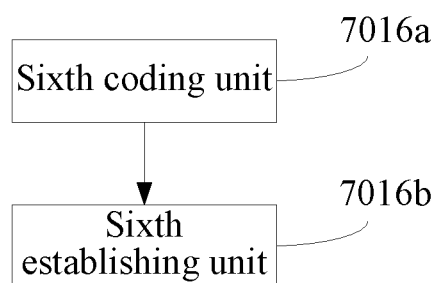
FIG. 12 is a schematic structural diagram of a fifth type of a coding module according to Embodiment 3 of the present disclosure.

Correspondingly, referring to FIG. 12, the coding module 701 includes:

a sixth coding unit 7016*a*, configured to perform joint coding on the number of ports, the pilot pattern, the pilot period, the sub-frame offset, the data muting position, the data muting period and the data muting offset that are in the CSI-RS configuration information, to obtain a third joint coding result; and a sixth establishing unit 7016*b*, configured to establish a mapping relation between the third joint coding result obtained by the sixth coding unit 7016*a* and the number of ports, the pilot pattern, the pilot period, the sub-frame offset, the data muting position, the data muting period and the data muting offset that are in the CSI-RS configuration information, where the CSI-RS configuration information code sent by the second sending module 705 is one of the third joint coding results.

Figure 13:
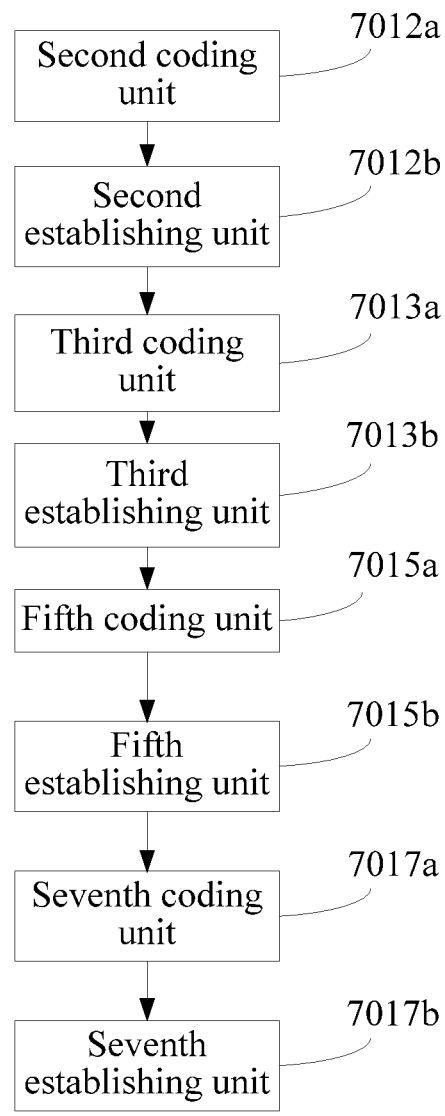
FIG. 13 is a schematic structural diagram of a sixth type of a coding module according to Embodiment 3 of the present disclosure.

Optionally, referring to FIG. 13, the coding module 701 includes:

a second coding unit 7012*a*, configured to perform correlative coding on the number of ports and the pilot pattern that are in the CSI-RS configuration information, to obtain a first coding result;

a second establishing unit 7012*b*, configured to establish a mapping relation between the first coding result obtained by the second coding unit 7012*a* and the number of ports and the pilot pattern that are in the CSI-RS configuration information;

a third coding unit 7013*a*, configured to perform correlative coding on the pilot period and the sub-frame offset that are in the CSI-RS configuration information, to obtain a second coding result;

a third establishing unit 7013*b*, configured to establish a mapping relation between the second coding result obtained by the third coding unit 7013*a* and the pilot period and the sub-frame offset that are in the CSI-RS configuration information;

a fifth coding unit 7015*a*, configured to code the data muting position in the CSI-RS configuration information, to obtain a third coding result;

a fifth establishing unit 7015*b*, configured to establish a mapping relation between the third coding result obtained by the fifth coding unit 7015*a* and the data muting position in the CSI-RS configuration information;

a seventh coding unit 7017*a*, configured to perform correlative coding on the data muting period and the data muting offset that are in the CSI-RS configuration information, to obtain a fourth coding result; and a seventh establishing unit 7017*b*, configured to establish a mapping relation between the fourth coding result obtained by the seventh coding unit 7017*a* and the data muting period and the data muting offset that are in the CSI-RS configuration information, where the CSI-RS configuration information code sent by the second sending module 705 is any coding result in the first coding results, any coding result in the second coding results, any coding result in the third coding results and any coding result in the fourth coding results.

The second coding unit 7012*a* is specifically configured to determine a corresponding relation between the number of ports and the pilot pattern that are in the CSI-RS configuration information, and perform joint coding on or respectively code the number of ports and the pilot pattern that are in the CSI-RS configuration information according to the corresponding relation.

The third coding unit 7013a is specifically configured to determine a corresponding relation between the pilot period and the sub-frame offset that are in the CSI-RS configuration information, and perform joint coding on or respectively code the pilot period and the sub-frame offset that are in the CSI-RS configuration information according to the corresponding relation.

The seventh coding unit 7017a is specifically configured to determine a corresponding relation between the data muting period and the data muting offset that are in the CSI-RS configuration information, and perform joint coding on or respectively code the data muting period and the data muting offset that are in the CSI-RS configuration information according to the corresponding relation.

The fifth coding unit 7015a is specifically configured to perform coding, in a bitmap manner, on the data muting position according to a pilot pattern position in the CSI-RS configuration information.

The second sending module 705 is specifically configured to add a bit used to carry the CSI-RS configuration information code in a system information block of a broadcast channel; or, use a remaining bit in a master information block to carry the CSI-RS configuration information code in the broadcast channel; or, define a new system information block used to carry the CSI-RS configuration information code in the broadcast channel; or, use a unicast channel to carry the CSI-RS configuration information code.

To conclude, in the device for notifying reference signal configuration information provided by this embodiment, because the CSI-RS is characterized by a small overhead, a long period, a high reuse factor, and low port pilot patterns nested in a high port pilot pattern, the CSI-RS configuration information is notified to the UE in the form of the CSI-RS configuration information code, so that the UE determines the CSI-RS configuration information according to the CSI-RS configuration information code, thus not only lowering the overhead, but also ensuring that the CSI-RSs of multiple cells do not collide with each other. Further, if the network device supports the muting technology, the information such as the data muting position, the data muting period and the data muting offset is notified to the UE, so that the CSI-RS is prevented from colliding with the data symbol sent by the strong interfering cell.

It should be noted that, when the device for notifying reference signal configuration information provided by the embodiment notifies the reference signal configuration information, the division of the foregoing functional modules is taken as an example for illustration. In practical application, different functional modules are allocated to implement the foregoing functions according to requirements, that is, the internal structure of the device is divided into different functional modules to implement all or part of the functions mentioned above. In addition, the device and the method for notifying reference signal configuration information provided by the foregoing embodiments are based on the same concept, and for details of the specific implementation process, reference may be made to the method embodiment, which are not repeatedly described here.

The sequence numbers of the foregoing embodiments of the present disclosure are merely for convenience of description, and do not imply the preference among the embodiments.

All or part of the steps according to the embodiments of the present disclosure may be implemented by hardware or by a program instructing relevant hardware. The program may be stored in a readable storage medium such as an optical disk or a hard disk.

The foregoing description is merely exemplary embodiments of the present disclosure, and is not intended to limit the present disclosure. Any modification, equivalent replacement, and improvement made without departing from the spirit and principle of the present disclosure shall fall within the protection scope of the present disclosure.

What is claimed is:

1. A method, comprising:
   receiving, by a terminal device from a base station through a downlink channel, channel state information-reference signal (CSI-RS) configuration codes, wherein the CSI-RS configuration codes comprise a first code, a second code, and a third code;
   determining, by the terminal device, a quantity of antenna ports of the base station for transmitting a CSI-RS and a CSI-RS pattern according to the first code;
   determining, by the terminal device, a CSI-RS period and an offset corresponding to the CSI-RS period according to the second code; and
   determining, by the terminal device, a data muting resource element (RE) according to the third code;
   wherein the quantity of antenna ports of the base station for transmitting the CSI-RS and the CSI-RS pattern are respectively indicated in the first code; and
   wherein the CSI-RS period and the offset corresponding to the CSI-RS period are jointly indicated in the second code.

2. The method according to claim 1, wherein the CSI-RS configuration codes further comprise a fourth code indicating a data muting period and a data muting offset, and the method further comprises:
   determining, by the terminal device, the data muting period and the data muting offset according to the fourth code.

3. The method according to claim 2, wherein the data muting period and the data muting offset are jointly indicated in the fourth code.

4. The method according to claim 2, wherein the downlink channel is a broadcast channel, and at least one of the first code, the second code, the third code, and the fourth code is sent through a system information block in the broadcast channel.

5. A terminal device, comprising: a transceiver and a processor, wherein
   the transceiver is configured to: receive, from a base station through a downlink channel, channel state information-reference signal (CSI-RS) configuration codes, wherein the CSI-RS configuration codes comprise a first code, a second code, and a third code;
   the processor is configured to: determine, based on the first code, a quantity of antenna ports of the base station for transmitting a CSI-RS, and a CSI-RS pattern, determine, based on the second code, a CSI-RS period and an offset corresponding to the CSI-RS period, and determine, based on the third code, a data muting resource element (RE);
   wherein the quantity of antenna ports of the base station for transmitting the CSI-RS and the CSI-RS pattern are respectively indicated in the first code; and
   wherein the CSI-RS period and the offset corresponding to the CSI-RS period are jointly indicated in the second code.

6. The terminal device according to claim 5, wherein the CSI-RS configuration codes further comprise a fourth code indicating a data muting period and a data muting offset, and the processor is further configured to:
determine, based on the fourth code, the data muting period and the data muting offset.

7. The terminal device according to claim 6, wherein the data muting period and the data muting offset are jointly indicated in the fourth code.

8. The terminal device according to claim 6, wherein the downlink channel is a broadcast channel, and at least one of the first code, the second code, the third code, and the fourth code is sent through a system information block in the broadcast channel.

9. A processor in a terminal device, coupled with a non-transitory storage medium storing processor-executable instructions, wherein the processor is configured to execute the instructions to:
obtain, from a base station, channel state information-reference signal (CSI-RS) configuration codes, wherein the CSI-RS configuration codes comprise a first code, a second code, and a third code;
determine, based on the first code, a quantity of antenna ports of the base station for transmitting a CSI-RS, and a CSI-RS pattern; and
determine, based on the second code, a CSI-RS period and an offset corresponding to the CSI-RS period,
determine, based on the third code, a data muting resource element (RE);
wherein the quantity of antenna ports and the CSI-RS pattern are respectively indicated in the first code; and
the CSI-RS period and the offset corresponding to the CSI-RS period are jointly indicated in the second code.

10. The processor according to claim 9, wherein the CSI-RS configuration codes further comprise a fourth code indicating a data muting period and a data muting offset, and wherein the processor is further configured to:
determine, based on the fourth code, the data muting period and the data muting offset.

11. The processor according to claim 10, wherein the data muting period and the data muting offset are jointly indicated in the fourth code.

12. A non-transitory storage medium storing program instructions that when executed by a processor of a device, cause the device to perform a process that comprises:
receiving channel state information-reference signal (CSI-RS) configuration codes, wherein the CSI-RS configuration codes comprise a first code and a second code; and
determining, based on the first code, a quantity of antenna ports of a base station for transmitting a CSI-RS, and a CSI-RS pattern;
determining, based on the second code, a CSI-RS period and an offset corresponding to the CSI-RS period, and
determining, based on the third code, a data muting resource element (RE);
wherein the quantity of antenna ports of the base station for transmitting the CSI-RS and the CSI-RS pattern are respectively indicated in the first code; and
wherein the CSI-RS period and the offset corresponding to the CSI-RS period are jointly indicated in the second code.

13. The non-transitory storage medium according to claim 12, wherein the CSI-RS configuration codes further comprise a fourth code indicating a data muting period and a data muting offset, and wherein the process further comprises:
determining, based on the fourth code, the data muting period and the data muting offset.

14. The non-transitory storage medium according to claim 13, wherein the data muting period and the data muting offset are jointly indicated in the fourth code.

* * * * *